US012302977B1

(12) United States Patent
Durham et al.

(10) Patent No.: US 12,302,977 B1
(45) Date of Patent: May 20, 2025

(54) LAMINAR FLOW PURIFIED AIR SYSTEM

(71) Applicants: Todd P. Durham, Fernandina Beach, FL (US); David M. Durham, Beaverton, OR (US)

(72) Inventors: Todd P. Durham, Fernandina Beach, FL (US); David M. Durham, Beaverton, OR (US)

( * ) Notice: Subject to any disclaimer, the term of this patent is extended or adjusted under 35 U.S.C. 154(b) by 935 days.

(21) Appl. No.: 17/351,076

(22) Filed: Jun. 17, 2021

Related U.S. Application Data

(60) Provisional application No. 63/040,919, filed on Jun. 18, 2020.

(51) Int. Cl.

| | |
|---|---|
| ***A62B 18/00*** | (2006.01) |
| ***A42B 3/00*** | (2006.01) |
| ***A42B 3/28*** | (2006.01) |
| *A62B 17/04* | (2006.01) |

(52) U.S. Cl.
CPC ............ *A42B 3/286* (2013.01); *A62B 18/003* (2013.01); *A62B 17/04* (2013.01); *A62B 18/006* (2013.01)

(58) Field of Classification Search
CPC .. A41D 13/0025; A41D 13/1153; A42B 3/04; A42B 3/286; A61M 16/0066; A61M 21/0094; A61L 9/20; A61L 2209/12; A61L 2209/14; A62B 7/00; A62B 17/04; A62B 18/003; A62B 18/006; A62B 18/045; A61F 9/06–068
See application file for complete search history.

(56) References Cited

U.S. PATENT DOCUMENTS

| | | | | | |
|---|---|---|---|---|---|
| 3,692,024 | A * | 9/1972 | Von Otto | A61B 46/00 | 128/847 |
| 3,736,927 | A * | 6/1973 | Misaqi | A62B 18/006 | 128/201.25 |
| 4,060,265 | A * | 11/1977 | Herbst | F16L 23/14 | 285/424 |
| 4,874,369 | A * | 10/1989 | Kulle | A61M 39/04 | 604/86 |
| 5,015,243 | A * | 5/1991 | Schifano | B08B 15/007 | 604/315 |
| 11,000,655 | B1 * | 5/2021 | Fox | A61M 16/0616 | |

(Continued)

FOREIGN PATENT DOCUMENTS

| | | | | |
|---|---|---|---|---|
| CN | 204580022 U | * | 8/2015 | |
| CN | 109469635 A | * | 3/2019 | F04D 25/08 |

OTHER PUBLICATIONS

Yu, Hong-tao, English Translation of "CN-204580022-U", Aug. 6, 2015 (Year: 2015).*

(Continued)

*Primary Examiner* — Timothy A Stanis
(74) *Attorney, Agent, or Firm* — Ashkan Najafi

(57) ABSTRACT

A laminar flow purified air system includes a halo-shaped body configured to provide a laminar air flow barrier between a user of the existing hat and an ambient environment surrounding the user. Such a halo-shaped body has an air inlet and a laminar air outlet and a pressure chamber in fluid communication with both the air inlet and the laminar air outlet. The air inlet and the pressure chamber are configured to force laminar air out from the laminar air outlet and thereby create the laminar air flow barrier.

17 Claims, 15 Drawing Sheets

(56) References Cited

U.S. PATENT DOCUMENTS

| | | | | |
|---|---|---|---|---|
| 2007/0163586 | A1* | 7/2007 | Burnett | A62B 23/02 128/205.29 |
| 2007/0173751 | A1* | 7/2007 | Ohashi | A61H 9/005 601/169 |
| 2007/0240719 | A1* | 10/2007 | Duarte | A62B 18/006 128/205.27 |
| 2009/0205664 | A1* | 8/2009 | Lyon | A61L 2/10 128/205.12 |
| 2010/0236267 | A1* | 9/2010 | Korytnikov | F24F 5/0035 62/426 |
| 2012/0093630 | A1* | 4/2012 | Fitton | F04D 25/08 415/90 |
| 2013/0017104 | A1* | 1/2013 | Stewart | F04D 25/08 415/203 |
| 2013/0118506 | A1* | 5/2013 | Osipov | F24F 9/00 128/858 |
| 2013/0243588 | A1* | 9/2013 | Lo | F24F 8/158 415/182.1 |
| 2014/0102442 | A1* | 4/2014 | Wilson | F24F 9/00 128/200.28 |
| 2014/0262759 | A1* | 9/2014 | Field | C25B 15/08 204/275.1 |
| 2014/0363315 | A1* | 12/2014 | Chen | F04D 25/08 417/151 |
| 2015/0273249 | A1* | 10/2015 | Wang | A62B 9/02 128/205.12 |
| 2017/0361133 | A1* | 12/2017 | Yu | F04D 19/007 |
| 2019/0242392 | A1* | 8/2019 | Whitmire | F04F 5/16 |

OTHER PUBLICATIONS

English translation of "CN 109469635 A", Mar. 15, 2019 (Year: 2019).*

* cited by examiner

LAMINAR FLOW PURIFIED AIR SYSTEM

CROSS REFERENCE TO RELATED APPLICATIONS

This is a non-provisional patent application that claims priority to and benefit of U.S. provisional patent application No. 63/040,919 filed Jun. 18, 2020, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to personal protection equipment and, more particularly, to a specially designed personal air purification system.

Prior Art

The Covid-19 pandemic has brought unprecedented demand for personal protection equipment including facial masks for protection from contamination both for and from the wearer. Personal protection equipment has primarily been utilized in specific industries such as healthcare, clean manufacturing and food processing. Current systems are restricting and cumbersome to wear. N95 masks are not convenient as they cover the users face restricting eating and drinking as well as communication and they must be fitted properly to be effective. Glasses wearers also find wearing masks frequently fog glasses and thereby impair vision. Standard surgical type or cloth masks and face shields have been shown to provide little protection, force inhalation of exhaled contaminants and may only enhance facial touching due to constant adjustment. Additionally, current face masks provide inconsistent filtration of particles as masks are produced by numerous manufactures using a myriad of different materials. Meanwhile, personal protection is compromised due to the inconvenience and stigma of mask wearing. Therefore, a suitable solution is desired.

Accordingly, a need remains for personal air purification system in order to overcome at least one of the above-noted shortcomings. The exemplary embodiment(s) satisfy such a need by providing a laminar flow purified air system that is convenient and easy to use, lightweight yet durable in design, versatile in its applications, and designed to protect a user wearer from harmful pathogens, allergens, smoke, and other environmental contaminants as well as protecting others from the user's exhaled air. The laminar flow purified air system facilitates convenient eating and drinking as there is no need to remove a physical mask, prevents fogging of glasses due to continuous airflow, while still providing the user with protection from the external unfiltered air while eating/drinking, talking, singing, etc.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a personal air purification system. These and other objects, features, and advantages of the non-limiting exemplary embodiment(s) are provided by a laminar flow purified air system that includes a halo-shaped body configured that may be attached to a brim of an existing hat or head worn apparatus or stationary stand and further configured to provide a laminar air flow barrier between a user and an ambient environment surrounding the user. Such a halo-shaped body has an air inlet and a laminar air outlet and a pressure chamber in fluid communication with both the air inlet and the laminar air outlet. Advantageously, the air inlet and the pressure chamber are configured to force laminar air out from the laminar air outlet and thereby create the laminar air flow barrier.

In a non-limiting exemplary embodiment, at least one pressurized tank, and air delivery tubing attached to the at least one pressurized tank and the air inlet. Notably, the air delivery tubing is configured to transfer air from the at least one pressurized tank to the pressure chamber.

In a non-limiting exemplary embodiment, at least one pressurizing air pump in communication with the at least one pressurized tank and the air delivery tubing, and at least one pressure valve switch in communication with the at least one pressurizing pump to control tank filling and prevent over pressurization.

In a non-limiting exemplary embodiment, an air filter in communication with the air delivery tubing and located within the at least one pressurized tank disposed upstream of the halo-shaped body.

In a non-limiting exemplary embodiment, the air filter includes a HEPA air filter or equivalent.

In a non-limiting exemplary embodiment, at least one pressurized tank includes a reflective interior surface. The laminar flow purified air system further includes at least one germicidal UVC light positioned within the at least one pressurized tank and adjacent to the reflective interior surface.

In a non-limiting exemplary embodiment, a power source in communication with the at least one pressurizing air pump and the at least one pressure valve switch and the at least one UVC light.

In a non-limiting exemplary embodiment, a first air displacement source having a first intake air filter and being in communication with the halo-shaped body for downwardly displacing exhaled air of the user away from the halo-shaped body, a collar configured to be positioned about a neck of the user, and a second air displacement source having a second intake air filter and being spaced downstream from the first air displacement source and further being in communication with the collar. Such a second air displacement source is configured to receive, cleanse, and guide the exhaled air into the collar air inlet vents. A return tubing is attached to the collar and configured to direct the recirculated cleansed exhaled air through the pump and back into the halo-shaped body.

In a non-limiting exemplary embodiment, the halo-shaped body has a substantially continuous and uninterrupted top surface. Advantageously, the air inlet is an orifice beginning at the substantially continuous and uninterrupted top surface and terminating within the pressure chamber prior to reaching the laminar air outlet.

In a non-limiting exemplary embodiment, each of the pressure chamber and the laminar air outlet is continuous about an entire circumferential length of the halo-shaped body. Advantageously, the laminar air outlet is concentrically juxtaposed about the pressure chamber.

In a non-limiting exemplary embodiment, the laminar air outlet is ring-shaped and configured to discharge the laminar air outwardly and away from the halo-shaped body.

In a non-limiting exemplary embodiment, an entrance velocity of air ingressing the air inlet is greater than an exit velocity of the laminar air egressing the ring-shaped laminar air outlet.

In a non-limiting exemplary embodiment, the ring-shaped laminar air outlet is uninterrupted and configured to continuously travel around the entire circumferential length of the halo-shaped body.

In a non-limiting exemplary embodiment, a plurality of auxiliary apertures juxtaposed along an inner wall of the halo-shaped body and penetrated through to the pressure chamber, while sized such as to maintain a pressure level within the pressure chamber. Advantageously, the auxiliary apertures are configured to improve positive pressure air flow out of the pressure chamber and across the face of the user.

In a non-limiting exemplary embodiment, the halo-shaped body has an inner diameter and an outer diameter each continuously extended along the entire circumferential length of the halo-shaped body and configured such that the laminar air, egressing the ring-shaped laminar air outlet, is continuously and evenly dispersed away from the bottom surface of the halo-shaped body.

In a non-limiting exemplary embodiment, the laminar air travels along a curvilinear and U-shaped travel path from the pressurized chamber and out from the laminar air outlet.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 2:
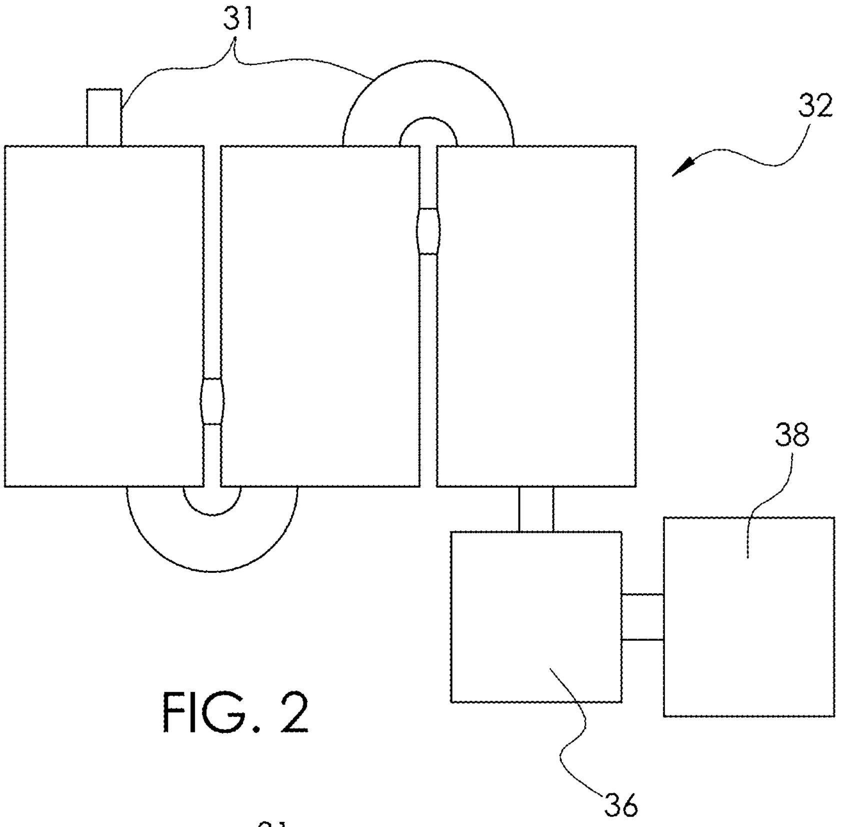
FIG. 2 is a front elevational view illustrating the laminar flow purified air system illustrating the HEPA filter, air inlet, pressure pump, pressurized tank s/cannisters, tubing leading to and connecting with air inlet on a halo, according to an embodiment of the present disclosure.
Figure 2A:
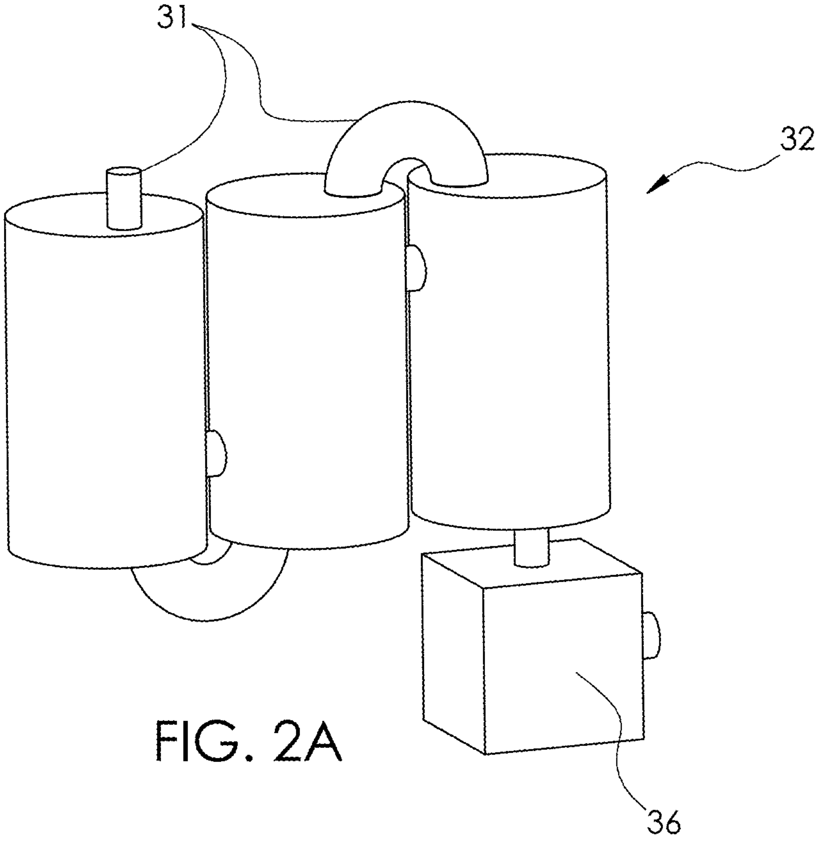

FIG. 2*a* is a perspective view illustrating the laminar flow purified air system illustrating the HEPA filter, air inlet, pressure air pump, pressurized tank s/cannisters, tubing leading to and connecting with air inlet on a halo, according to an embodiment of the present disclosure.

Figure 2B:
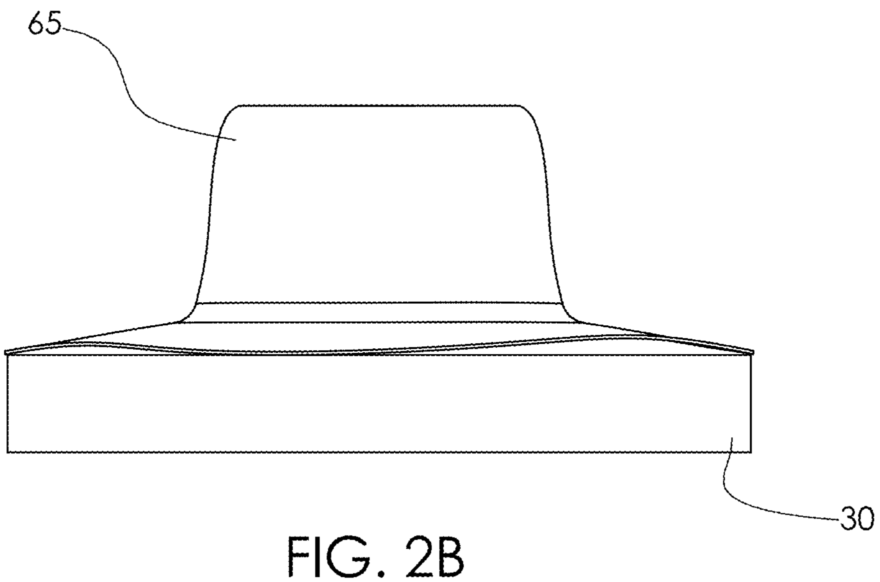

FIG. 2*b* is a front elevational view illustrating the laminar air flow out from the halo incorporated within a hat, according to an embodiment of the present disclosure.

Figure 2C:
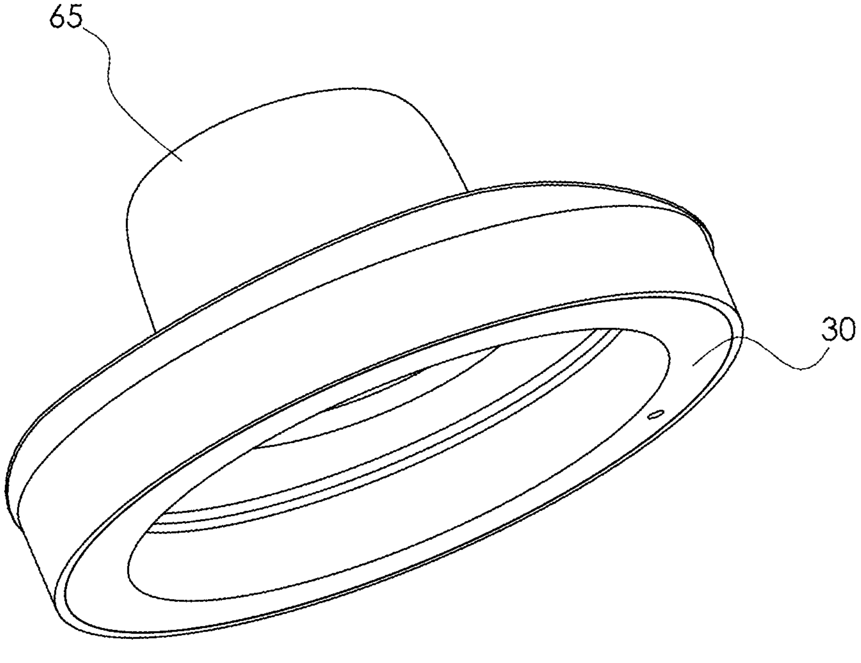

FIG. 2*c* is a perspective view illustrating the laminar air flow out from the halo incorporated within a hat, according to an embodiment of the present disclosure.

Figure 3:
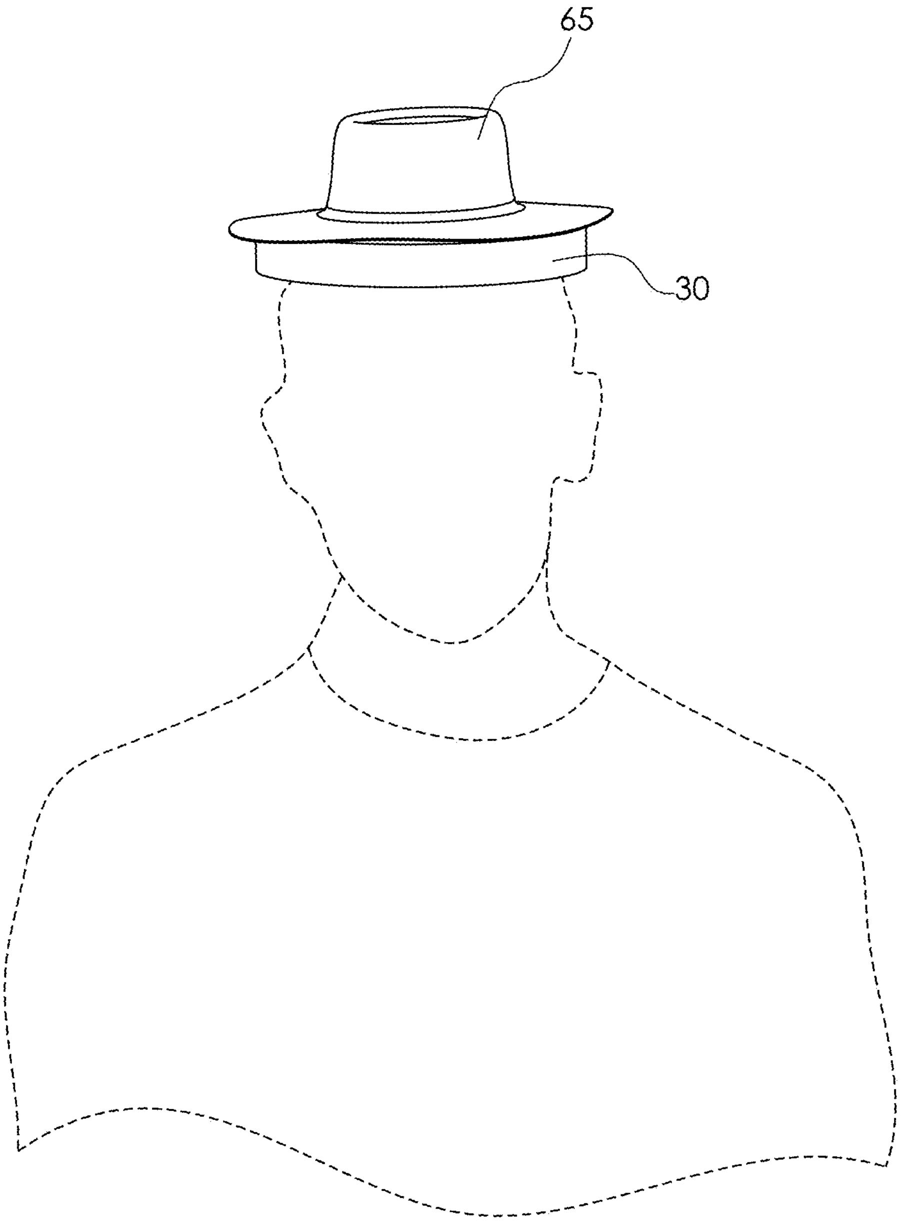

FIG. 3 is a perspective view of the laminar flow purified air system during an 'in-use' condition including the halo incorporated into a brim of a hat according to an embodiment of the present disclosure.

Figure 4:
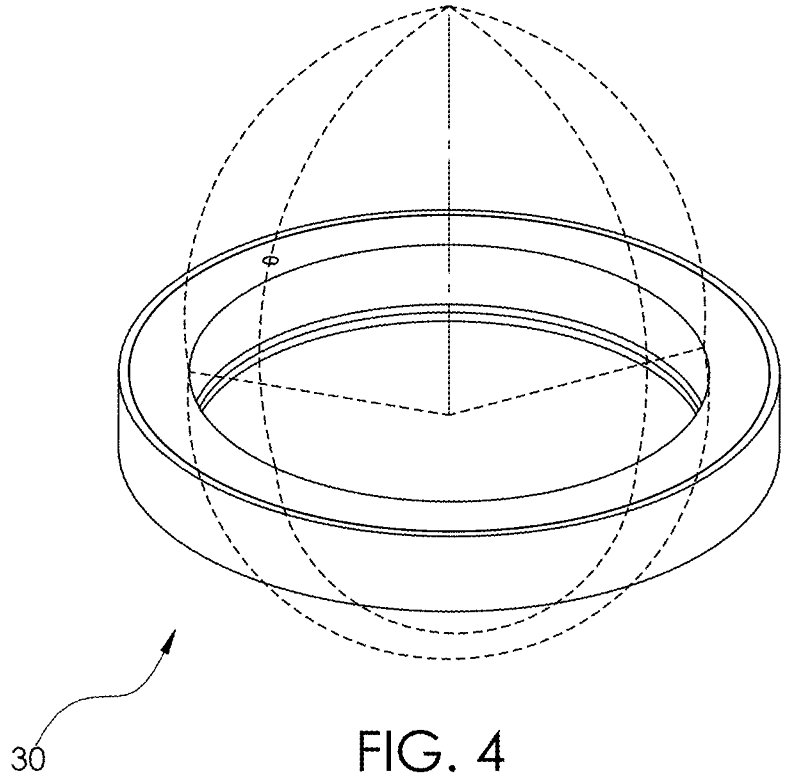

FIG. 4 is a perspective view of the halo of the laminar flow purified air system according to an embodiment of the present disclosure.

Figure 5:
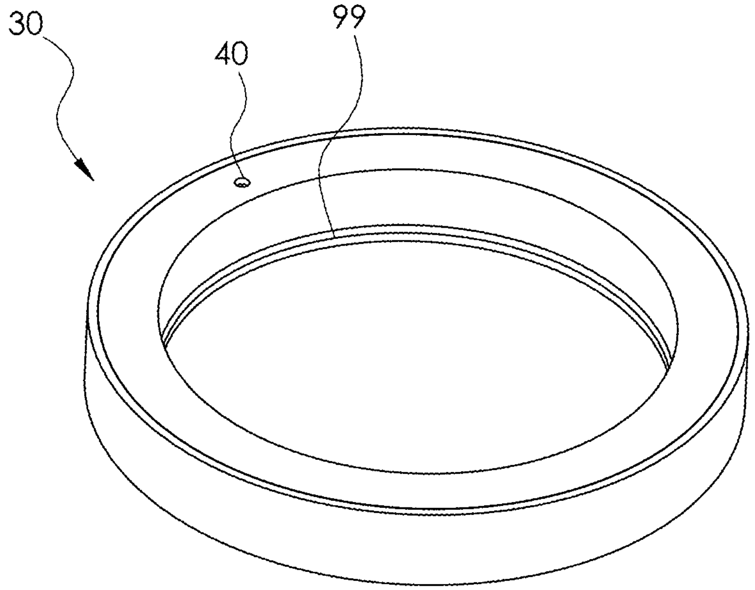

FIG. 5 is a perspective view of the halo of the laminar flow purified air system according to an embodiment of the present disclosure.

Figure 6:
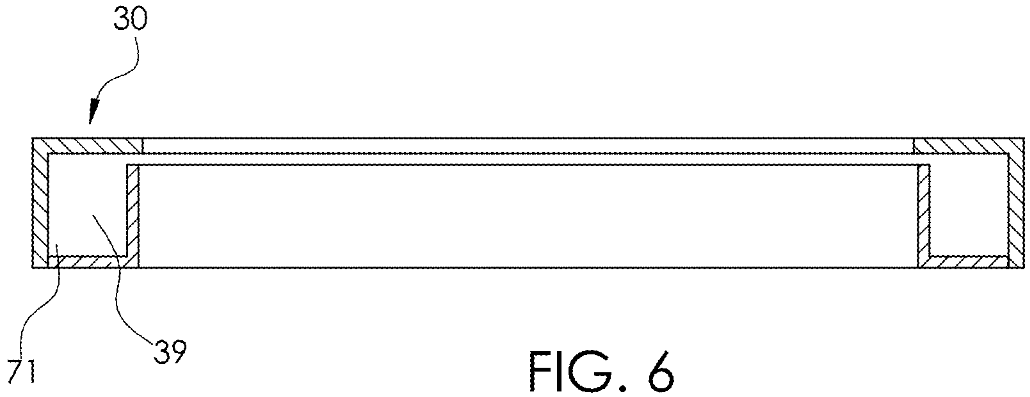

FIG. 6 is a cross-sectional view of the halo of the laminar flow purified air system showing the laminar flow outlet and pressure chamber according to an embodiment of the present disclosure.

Figure 7:
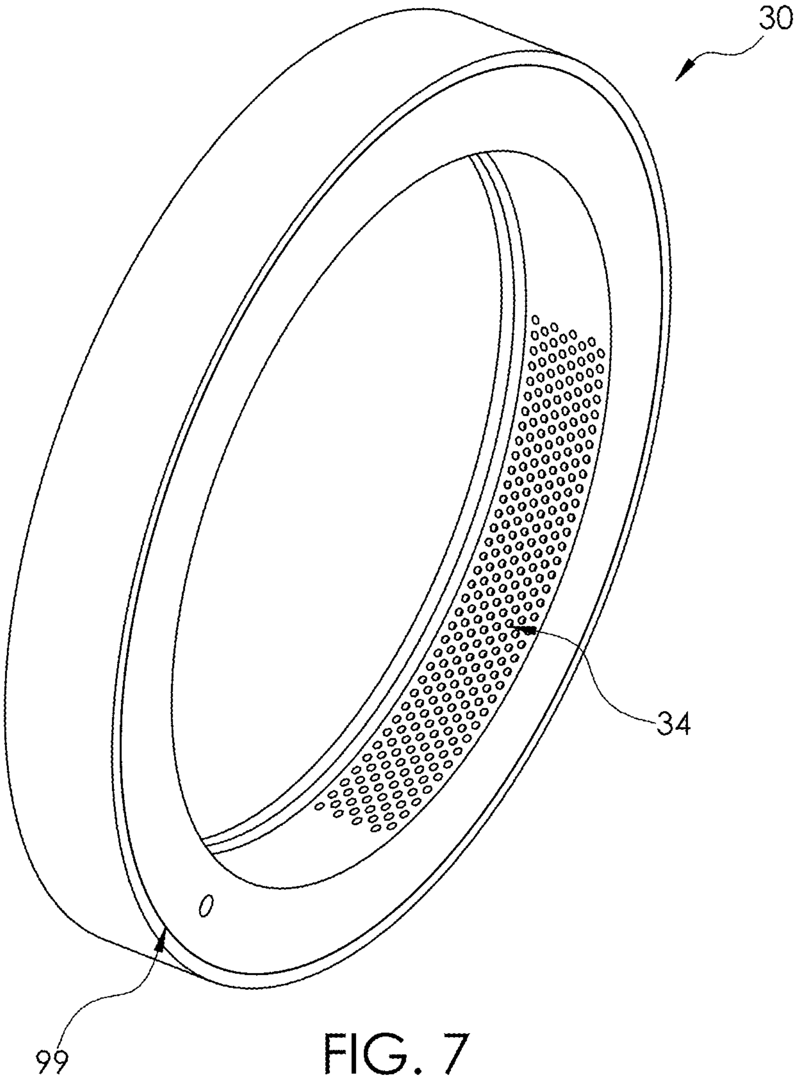

FIG. 7 is a perspective view of the halo of the laminar flow purified air system illustrating the pressure chamber, outer laminar flow outlet and inner holes/vents/auxiliary apertures for positive pressure airflow according to an embodiment of the present disclosure.

Figure 8:
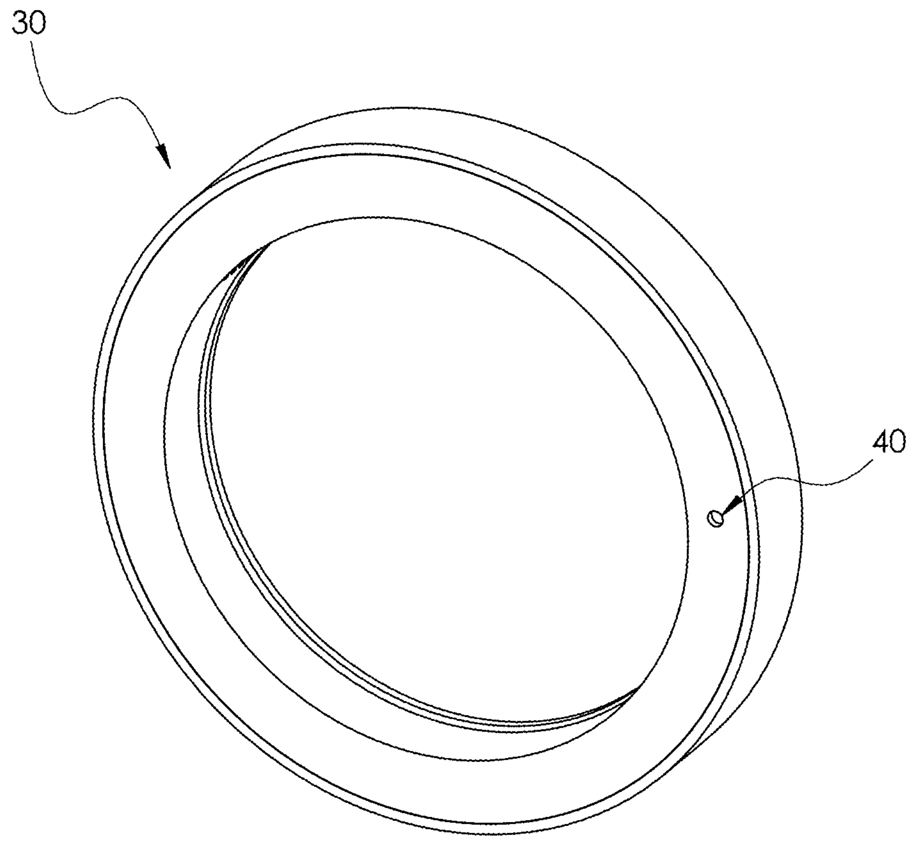

FIG. 8 is a perspective view of the halo of the laminar flow purified air system illustrating the air intake port of the halo for tubing attachment according to an embodiment of the present disclosure.

Figure 9:
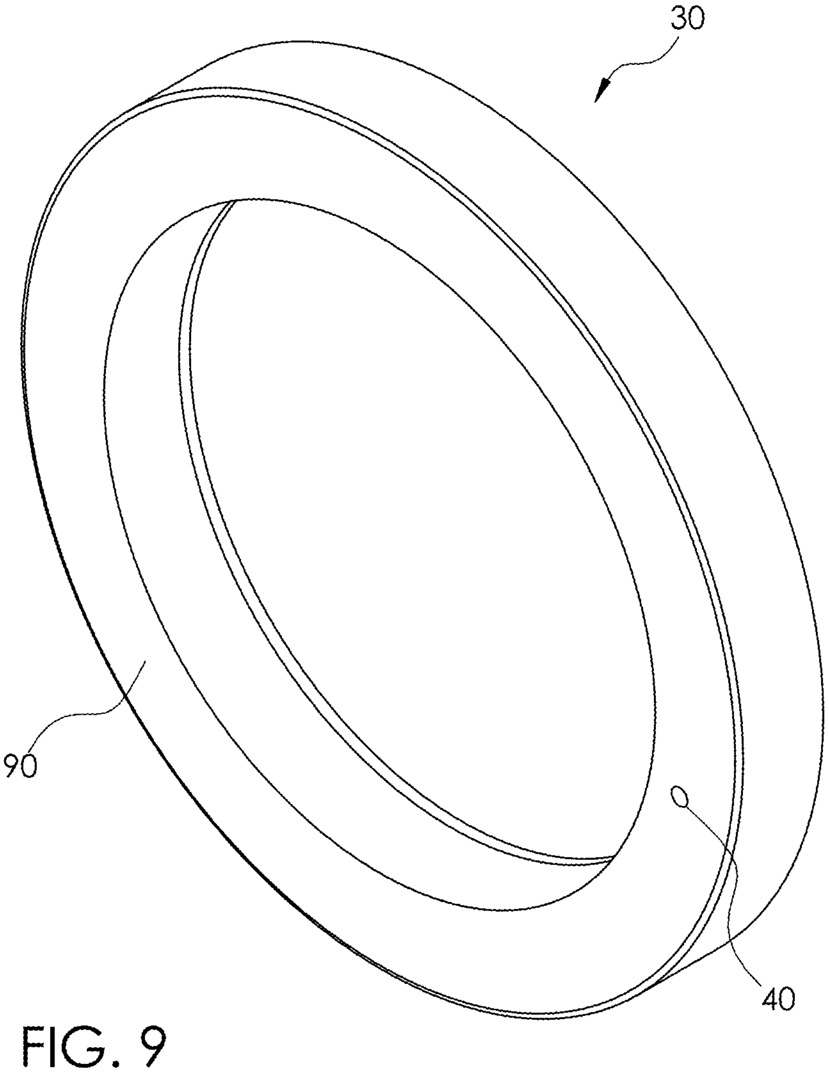

FIG. 9 is another perspective view of the halo of the laminar flow purified air system illustrating the air intake port of the halo for tubing attachment according to an embodiment of the present disclosure.

Figure 10:
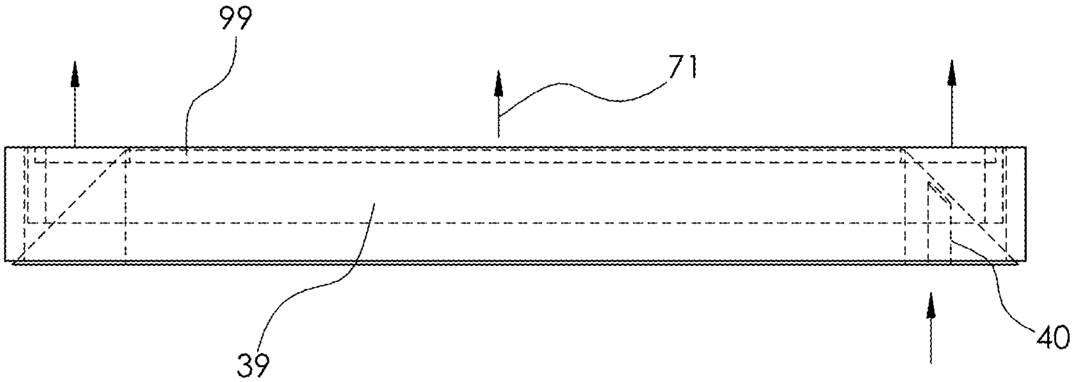

FIG. 10 is a transparent front elevational view of the halo of the laminar flow purified air system illustrating the air intake port of the halo for tubing attachment according to an embodiment of the present disclosure.

Figure 11:
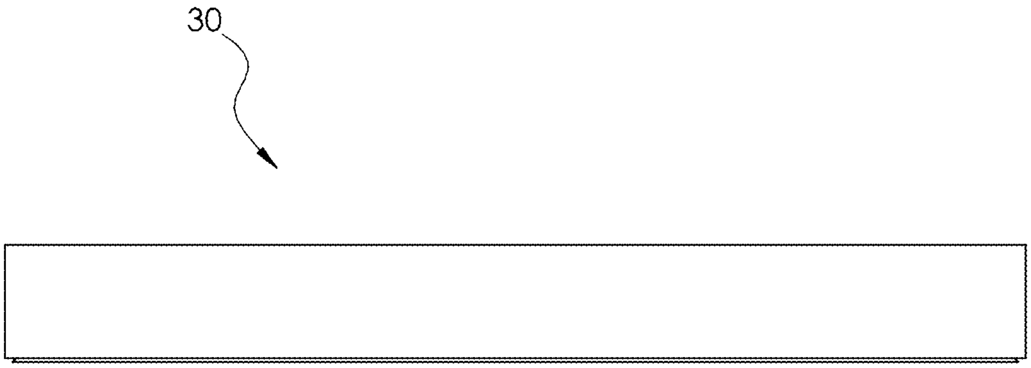

FIG. 11 is another front elevational view of the halo of the laminar flow purified air system illustrating the air intake port of the halo for tubing attachment according to an embodiment of the present disclosure.

Figure 12:
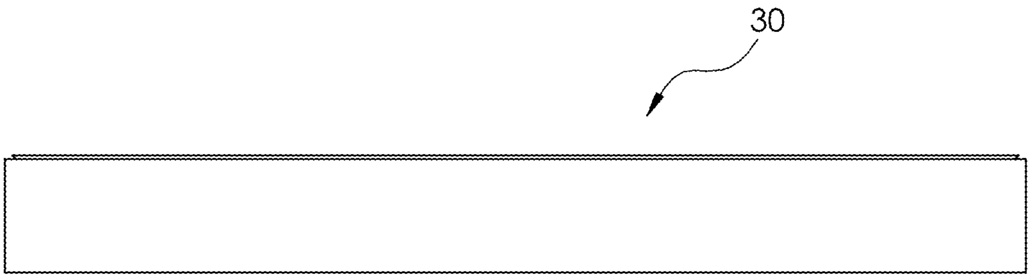

FIG. 12 is a rear elevational view of the halo-shaped body, according to an embodiment of the present disclosure.

Figure 13:
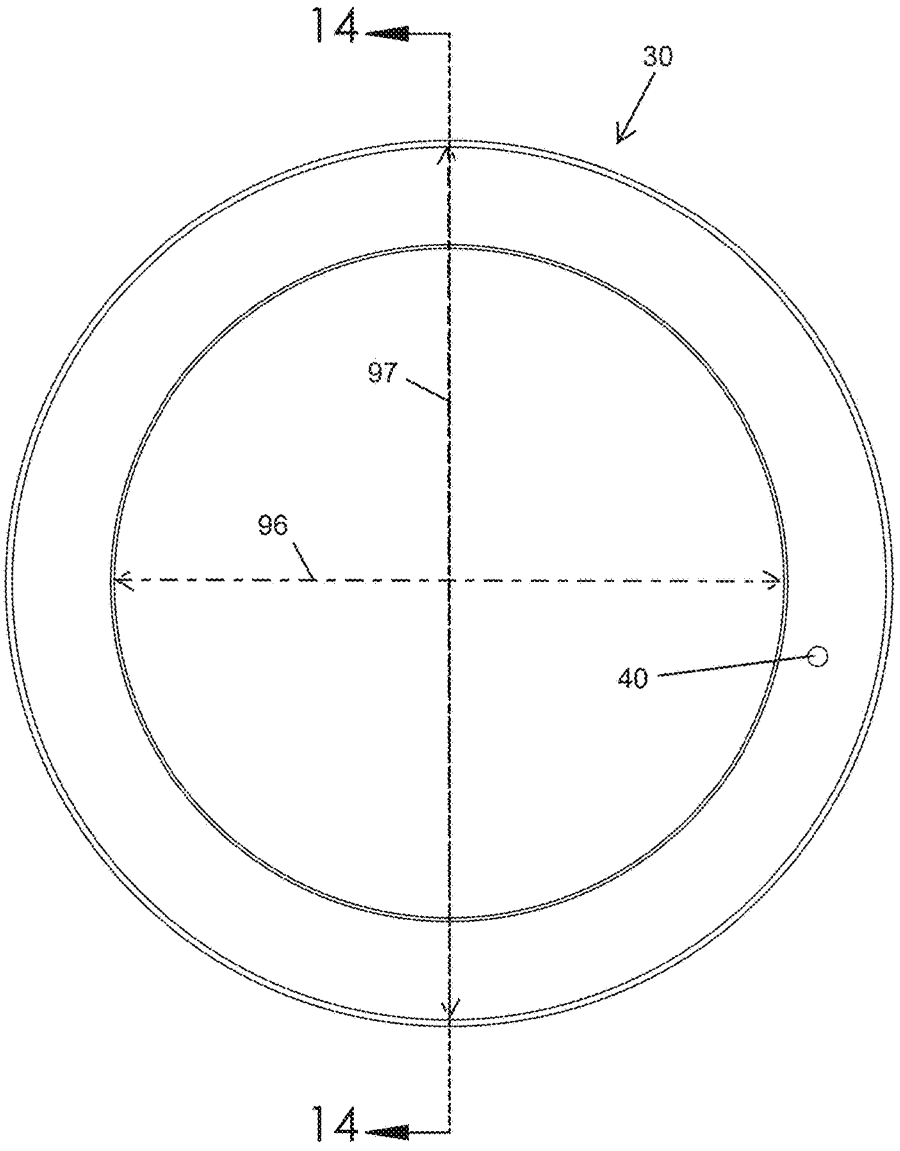

FIG. 13 is a top plan view of the halo-shaped body, according to an embodiment of the present disclosure.

Figure 14:
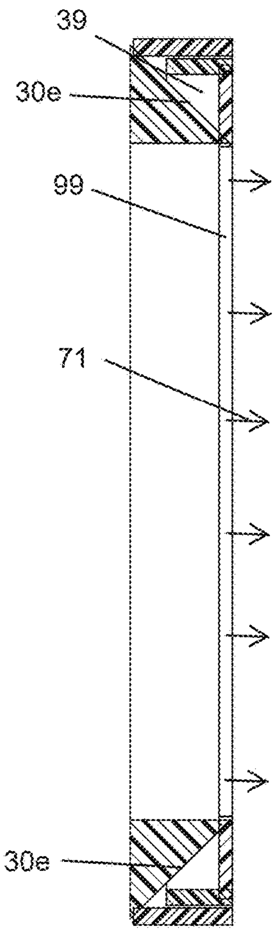

FIG. 14 is a cross-sectional view taken along line 14-14 in FIG. 13.

Figure 15:
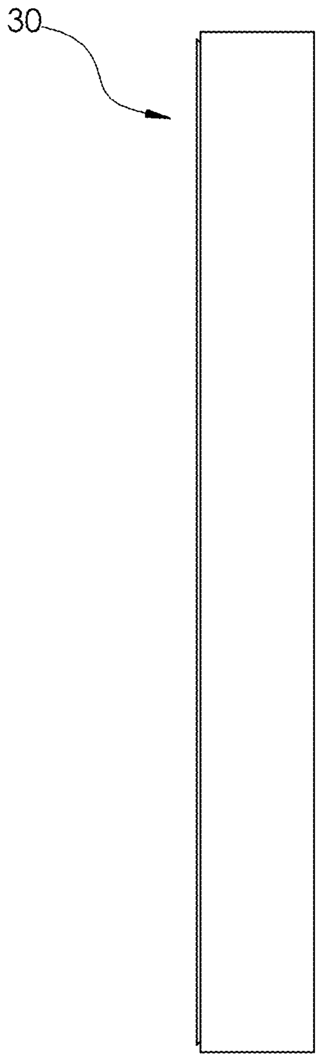

FIG. 15 is a left-side elevational view of the halo-shaped body, according to an embodiment of the present disclosure.

Figure 16:
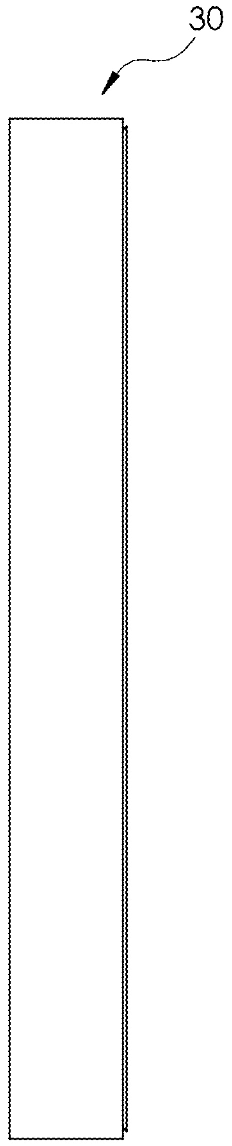

FIG. 16 is a right-side elevational view of the halo-shaped body, according to an embodiment of the present disclosure.

Figure 17:
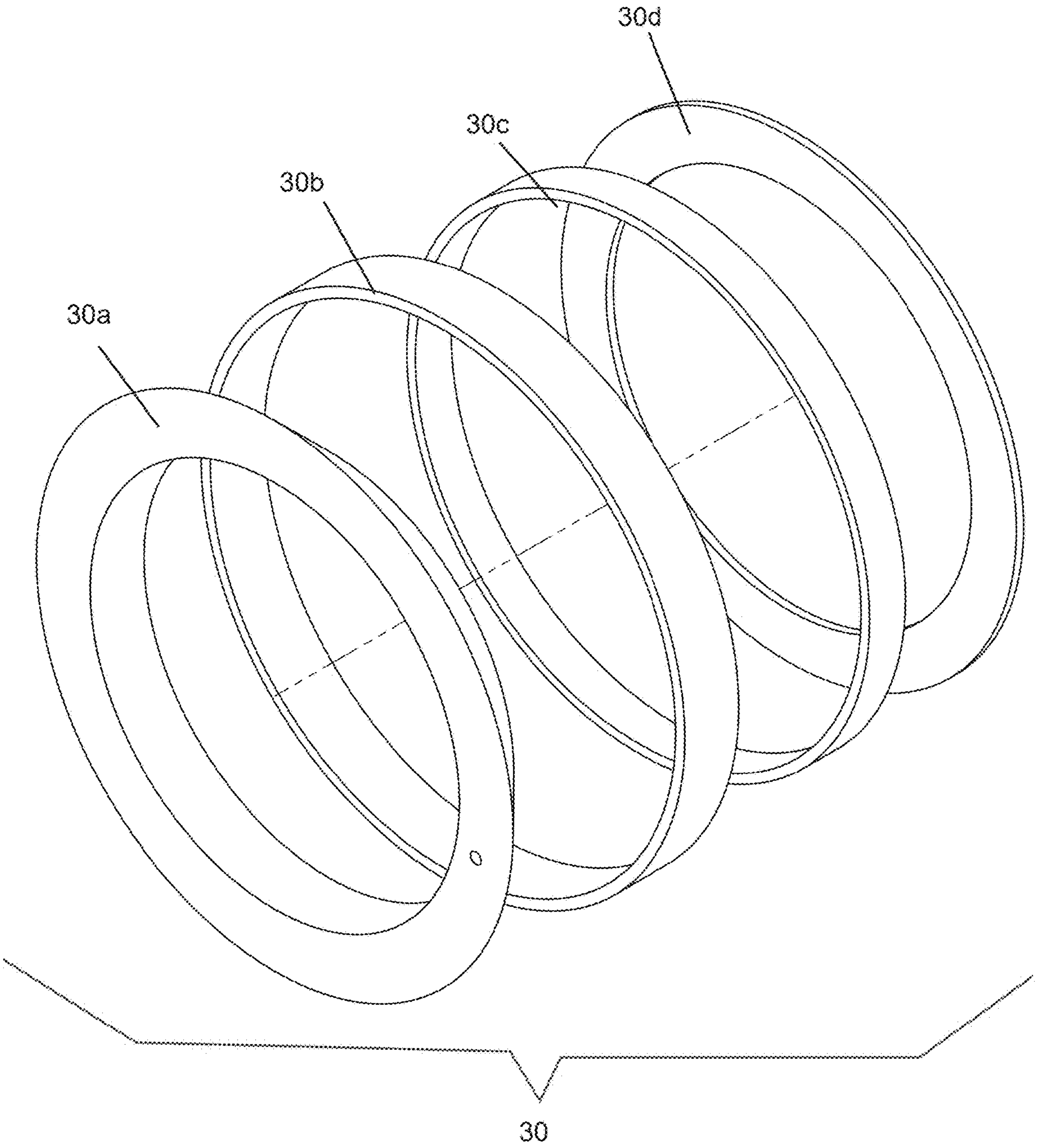

FIG. 17 is an exploded view of the halo-shaped body, according to an embodiment of the present disclosure.

Figure 18:
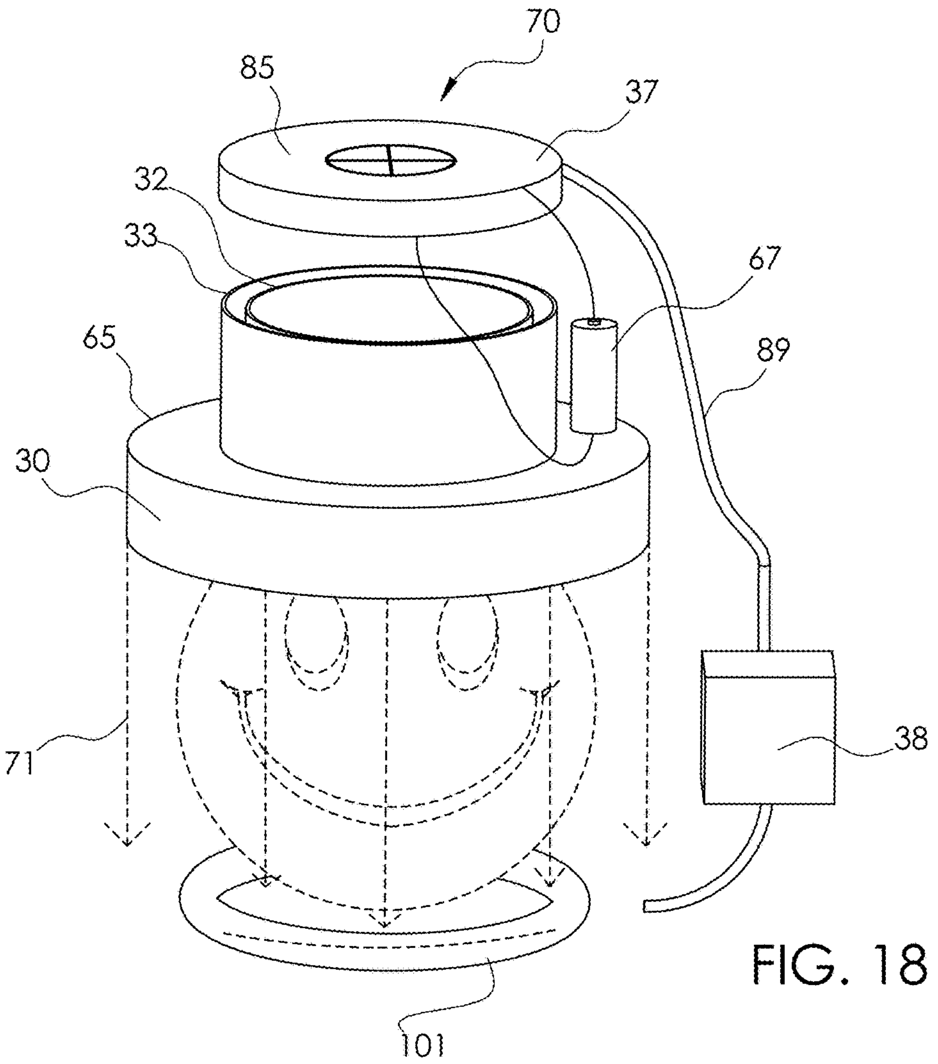

FIG. 18 is an integrated high-level schematic diagram illustrating the interrelationship between some of the major components of the laminar flow purified air system within a self-contained, head-worn apparatus, using a continuously operating high volume air pump, according to an embodiment of the present disclosure.

Figure 19:
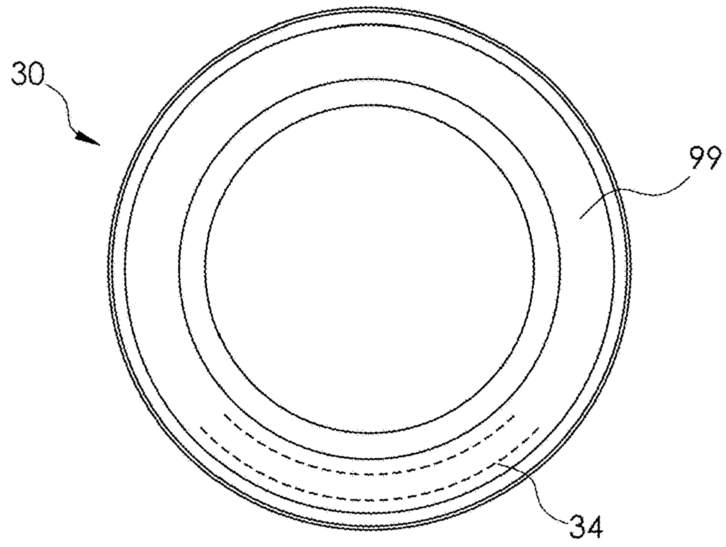

FIG. 19 is a bottom plan view of the halo-shaped body shown in FIG. 18 illustrating the continuous laminar air flow outlet and air hole vents positioned above the wearer's face.

Figure 20:
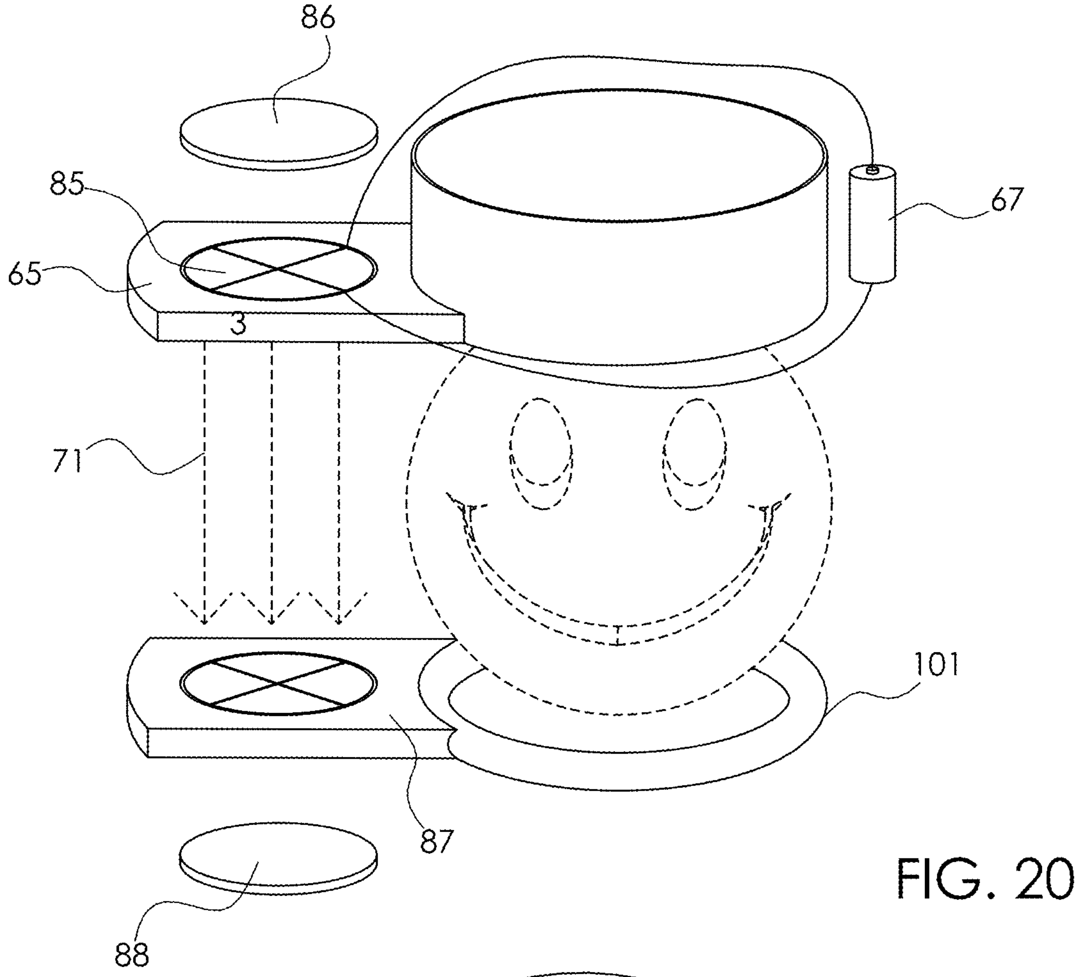

FIG. 20 is another high-level schematic diagram illustrating the interrelationship between some of the major components of the laminar flow purified air system, according to an embodiment of the present disclosure.

Figure 21:
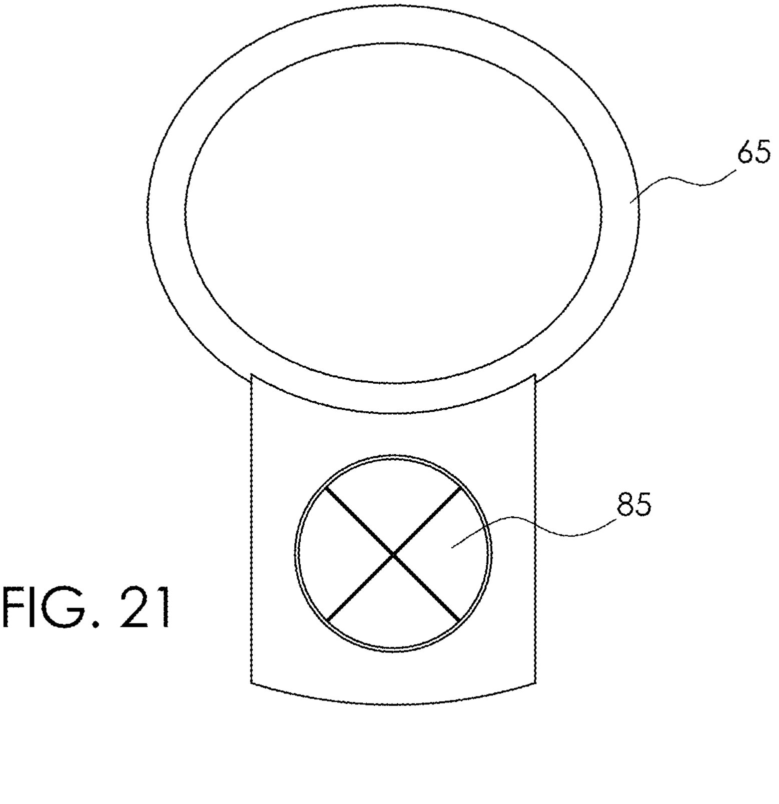

FIG. 21 is a bottom plan view of the halo-shaped body, air filter, and electric fan shown in FIG. 20.

Figure 22:
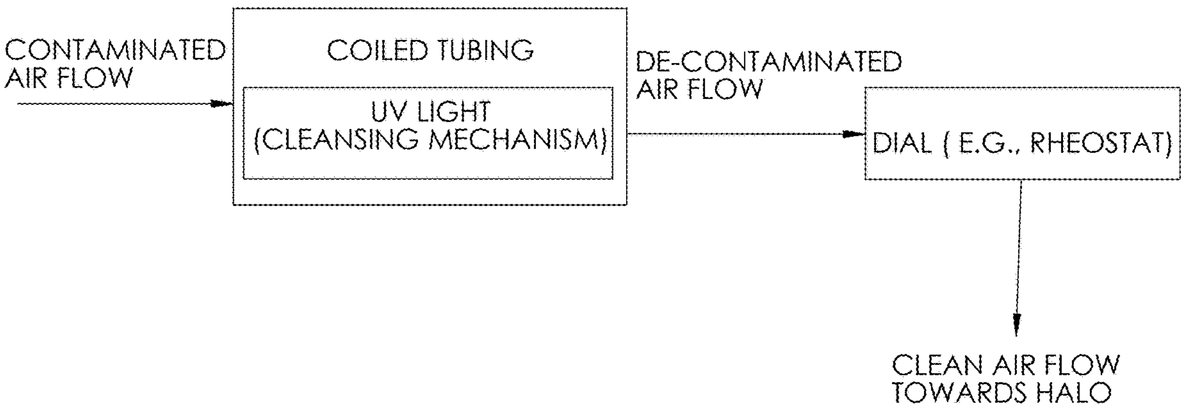

FIG. 22 is a high-level schematic block diagram showing an air flow cleansing mechanism including UV light(s)

positioned either adjacent to or within coiled tubing transporting contaminated air, according to an embodiment of the present disclosure.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes, integration or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means±15% of the numerical.

If used herein, "substantially" means largely if not wholly that which is specified but so close that the difference is insignificant.

The terms "halo" and "halo-shaped body" are interchangeably used throughout the present disclosure.

The term "vent" means any opening that allows air to flow in or out therefrom (e.g., inlet, outlet, aperture, orifice, etc.).

As used throughout this disclosure, a HEPA filter, also known as high-efficiency particulate absorbing filter and high-efficiency particulate filter, is an efficiency standard of air filter. UV and UVC acronyms are also used. UV is Ultraviolet light wherein the germicidal characteristic is relevant to the present disclosure. As a non-limiting example, ultra-violet (UV) light is divided into UV-A, UV-B and UV-C. UV-Cis found within 100-280 nm range. Germicidal action is maximized at 265 nm.

A non-limiting exemplary embodiment(s) of the present disclosure is referred to generally in FIGS. 1-22 and is intended to provide user protection from environmental contaminants and further provides a consistent source of purified (filtered) air for breathing. It should be understood that the exemplary embodiment(s) may be used to provide continuous disinfected laminar air flow 71, and should not be limited to any particular laminar flow purified air system 70 described herein.

Figure 1:
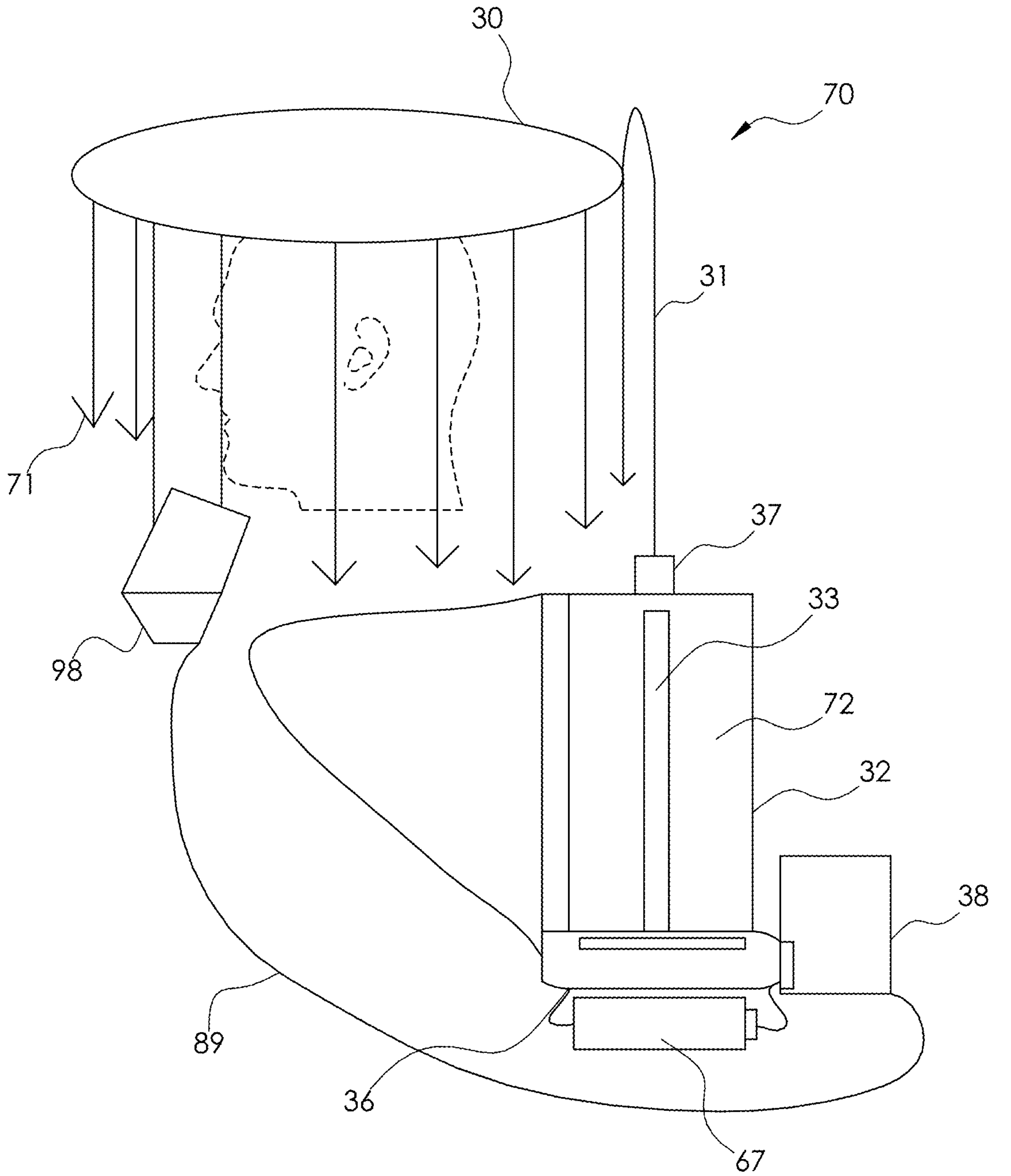
FIG. 1 is a perspective view of a laminar flow purified air system, according to an embodiment of the present disclosure.

FIG. 1 is a perspective view of a laminar flow purified air system 70, according to an embodiment of the present disclosure. The system 70 is illustrated during an 'in-use' condition showing a halo 30, tubing 31, pressure valve switch(es) 37, a series of pressurized tank(s) 32, UVC light 33, pressurizing pump 36, replaceable HEPA air filter 38 in a box connected to the pump 36, battery 67 location options, air vacuum inlet 98, return tubing 89 back to the air filter 38, and storage bag (e.g., back pack with shoulder straps), or other fixed housing for a stationary system. The air vacuum inlet 98 may be attached to the straps of a backpack configuration of the storage bag or a collar 101 (FIG. 20) to be positioned to recirculate and cleanse the exhaled air of the user.

The laminar flow purified air system 70 combines the technologies of UVC light 33 purification and/or replaceable HEPA or equivalent air filtration 38 and laminar air flow 71 and/or air knife technology to provide a safe clean air environment free from cross contamination based on the directed movement of air. The laminar flow purified air system 70 can provide protection from environment contaminants such as Covid-19, SARS-COV respiratory droplets and air-borne pathogens and contaminants such as the measles virus, pollution, or allergen irritants.

Referring to FIGS. 1-22 in general, in a non-limiting exemplary embodiment(s), the laminar flow purified air system 70 includes a halo 30, which may be a stand-alone member supported near a user's head or, which may be optionally incorporated into a brim of an existing hat 65. The halo 30 includes a continuous circular air outlet 99 that provides the laminar air flow 71 or air knife barrier between the user and their outside environment. The halo 30 may be incorporated to a hat 65 either circumferentially for a sombrero type hat or forward facing for baseball or visor type hats. The halo 30 may also surround just the face in a helmet-like configuration blowing air sideways out and away from face, or the halo 30 could be a collar configuration adjustably positioned around a user neck blowing air up instead of down. Some configurations of the halo 30 may be stationary, (e.g., affixed to a support surface such as a seat, desk, table, wall, ceiling, or floor), where a user would sit, stand, or lie under the halo 30 to be protected from contaminants in the external ambient environment. The halo 30 may be a ring or other rounded (circular) shape, elliptical, oblong, oval, egg-shaped, rectangular with rounded corners, etc. to create a continuous enveloping perimeter with laminar air flow 71.

Some configurations may include a hat 65 or head worn halo 30 for pressurized laminar purified air flow 71 downward and a negative pressure collar 101 around the neck (or vice-versa) used to vacuum and then filter/purify air exhaled from the user to better protect others. The purified air system 70 cleanses the exhaled air via partial recirculation of the user's exhaled air via suction by the air pump 36 back through the air filter(s) 38 and/or germicidal UVC light 33. The laminar air flow 71 works both ways, as a boundary for air coming into the user ambient space, but also for exhaled air moving out of the user ambient space.

In a non-limiting exemplary embodiment, the laminar air flow 71 passing through the halo 30 may powered by pressurized tank(s) 32, vessels, or cannisters connected to the halo 30 by plastic tubing/ducting 31. The air in the tanks 32 or cannisters is free of biological or viral contaminants as is disinfected by a germicidal UVC light 33 that is inside the pressurized tank(s) 32 to protect the user from the emitted ultraviolet radiation. Additionally, the pressurized tank(s) 32 include a reflective coating along an interior surface 72 to amplify light emitted by the UVC light 33. The filtered air from the pressurized tank(s) 32 also provide clean air for the user to breathe. The filtered air for breathing is facilitated through an air inlet 40 and passes through a pressure chamber 39 in the halo 30 located between the air inlet 40 and continuous air outlet 99 (vent) to allow continuous clean airflow over the user's face. The continuous air outlet 99 allows the user to breathe in the clean air when inhaling and provides a laminar air flow 71 pushing the exhaled air down away from the face, nose, and mouth where it may be collected by a negative pressure system. The continuous air outlet 99 produces a higher-pressure laminar flow providing an invisible contamination barrier between the user and the outside environment. The air outlet holes (apertures) 34 produces a lower velocity laminar air flow 71 providing clean air to breathe and facilitating the removal of exhaled air out of the system 70 and away from the face.

In one embodiment, a three-tank system has several tanks 32 with different capacities. The middle tank is where the disinfection occurs. The tank connected to the pump 36 can have a larger capacity (fill to higher PSI). That way, when the valve opens to the middle tank, the pressure will equalize quickly, and the middle tank will fill quickly. Then disinfection occurs in the middle tank (or completes), e.g., germicidal UVC light 33, and then the middle tank valve releases to the tank connected to the halo 30, and again, pressure equalizes quickly, and the first tank is refilled quickly. This is like a locks system for air, ensuring that the middle tank can decontaminate a volume of air completely before introducing new air into the middle tank.

More specifically, the system providing the clean air flow includes 2-4 pressurized tanks 32, 1-4 pumps 36, 1 UVC light 33 per pressurized tank 32, 1-4 pressure valve switches 37, and 1-4 batteries 67. The batteries 67 (disposable or rechargeable), electric cord, solar or other power source provide power to both the UVC light 33 and the pump(s) 36. One pressurized tank 32 at a time provides the airflow for the system. Pressurized tank 32 fills to full pressure triggering pressure switch 37, switching off a first valve A switching on a second valve B where valves A and B are attached to the air pressure pump 36. Similarly, pressure switch 37 will trigger release valve to exhaust tank/cannister and then to the halo 30 once filled. In certain embodiments, a three-pressurized tank 32 or cannister system may be necessary to ensure continuous airflow of properly disinfected air depending on pump 36 performance.

In yet another embodiment, a germicidal UVC light 33 and/or HEPA filters are provided for some or all the pressurized tanks 32. A replaceable HEPA filter 38 may be included within the pump 36 air inlet. HEPA filtered systems may only require one pressurized tank 32, or may be directly connected to the halo air inlet 40, due to the continuous filtering. The pump 36 is attached to the last tank and provides continuous pressurization. When the last pressurized tank 32 is full, the valve releases to quickly pressurize the middle-pressurized tank 32 and then closes for the last tank to re-pressurize. After the air is sterilized in the middle holding tank, the valve opens to quickly pressurize the first pressurized tank 32. The first pressurized tank 32 is then constantly releasing pressurized clean air into the halo 30. The halo 30 is provided in a ring form and includes a pressurization compartment (pressure chamber 39) and a double sidewall system to allow for additional laminar air flow 71 around an entire circumference of the halo 30. Some embodiments may include HEPA filters 38 or germicidal UVC light 33 inside the halo's pressurization compartment.

The halo 30 provides a 360-degree air knife via the continuous outlet 99 preventing external air into the space all around the head and deflecting external air downwards. Meanwhile, an inner portion of the ring may provide small holes or apertures 34 (vents) to allow a positive pressure system delivering purified air within the circumference of the ring where the laminar air flow 71 or air knife acts as the boundary between the internal positive pressure air and the lower pressure external air, exhausting the internal positive air below the eyes, nose, and mouth of the user. This positive internal pressure also provides continuous flow of clean and oxygenated air to the user. The user's exhalations are also directed downward where they are a lesser risk to others and may be collected by a negative pressure or vacuum filtration system located under the nose and mouth. Germicidal UVC light 33 also may ionize the air providing additional purification to the exhausted air of the user protecting the user and others.

As perhaps best shown in FIGS. 18-21, the recirculation intake may be positioned below the face to pull exhaled air from the user for purification, or similarly, an additional vacuum system with filtration to collect and filter the exhaled air, as additional protection of others.

In one embodiment, the tank/cannister 32, pump 36, battery 67, and pressure valve switch 37 maybe contained in a carrying case that can be worn as a backpack, shoulder pack, fanny pack, side pack, front pack, integrated into or even attached to the hat 65 supporting the halo 30 or another convenient location. This enclosure can contain or be composed of sound proofing materials to minimize noise generated by the air pump 36. A power switch to turn the system on or off can be located on the pack, the brim of the hat 65 supporting the halo 30 or another convenient location. Laminar air flow 71 may be adjusted with a dial (e.g., rheostat) positioned on the brim of the hat 65 or another convenient location to allow for increased flow when in outside wind environment versus inside a calm air environment such as store or restaurant. Additionally, more than one pressure/air pump 36 may be used, or none at all, as it could just use prefilled or exchanged tanks of purified air, or even an external air pressure source connected directly to the halo 30 in the case of a stationary system.

In certain embodiments, the system includes only a halo 30, a pressure pump 36 or fan and a HEPA filter 38 and/or UVC light 33 purification. The halo 30 incorporates a pressure chamber 39 therein. The pressure pump 36 may connect directly to the pressure chamber 39 of the halo 30. Here a replaceable HEPA filter 38 may be installed in the pump 36 air inlet and/or a germicidal UVC light 33 or an array of germicidal UVC LEDs may be included within the pressure chamber 39 of the halo 30. The pressure chamber 39 in the halo 30 is an important structural component as it creates even pressure for the exhaust ring outlet 99 to produce an even laminar air flow 71.

In an alternative embodiment, a coiled clear plastic or glass pressure tubing system, transparent for UVC light 33, is utilized as an alternative to switching between multiple air tanks or cannisters. The air pump 36 supplies the pressurized air for the tubing system and the germicidal UVC light 33 purifies the air as it travels through the long tubing and the disinfected pressurized air exits through the halo 30 providing laminar air flow 71 and breathable lower pressure air. The UVC transmissible pressure tubing system and UVC light 33 source may be encased in an opaque or reflective enclosure providing the internal disinfectant and providing external protection from UVC light 33. This pressure tubing system and UVC light 33 may eliminate the need for tanks/cannisters and pressure switch(es) 37 or be used in combination with tanks in serial or parallel configurations. As an option, a replaceable HEPA air filter 38 can be attached to the air inlet 40 or output on the air pump 36 to provide additional filtration.

In yet another embodiment, the disinfected laminar air flow system 70 includes a clear plastic face shield which covers the face. The plastic face shield would substitute for the high-pressure laminar air flow 71 as the barrier. The UVC pressurized laminar air flow 71 described in the options previously would only be used to provide the lower pressure disinfected air for breathing. The low-pressure laminar air flow 71 provides disinfected air to inhale and a continuous laminar flow removing exhaled air and not allowing any contaminated air into the users protected environment. This option incorporates the laminar air flow 71 into a more traditional personal protection mask. Any positive pressure system using disinfected air that keeps outside air out of the face could be sufficient for the face shield option. Blowing clean (HEPA filtered 38) air into the visor section may provide the necessary flow of clean air in the area surrounding the face without the need of a complete laminar flow system. Similarly, exhaled air from the user may be collected by a negative pressure/vacuum system and filtered before being returned to the environment.

Referring to FIGS. 1-22 in general, in a non-limiting exemplary embodiment, a laminar flow purified air system 70 includes a halo-shaped body 30 which may be optionally configured to attach to an existing brim of an existing hat 65 or head worn apparatus or stationary stand and further configured to provide a laminar air flow 71 barrier between a user and an ambient environment surrounding the user. Such a halo-shaped body 30 has an air inlet 40 and a laminar air outlet 99 and a pressure chamber 39 in fluid communication with both the air inlet 40 and the laminar air outlet 99. Advantageously, the air inlet 40 and the pressure chamber 39 are configured to force laminar air flow 71 out from the laminar air outlet 99 and thereby create the laminar air flow 71 barrier.

In a non-limiting exemplary embodiment, at least one pressurized tank 32, and air delivery tubing 31 are attached to the at least one pressurized tank 32 and the air inlet 40. Notably, the air delivery tubing 31 is configured to transfer air from the at least one pressurized tank 32 to the pressure chamber 39.

In a non-limiting exemplary embodiment, at least one pressurizing pump 36 is in communication with the at least one pressurized tank 32 and the air delivery tubing 31, and at least one pressure valve switch 37 is in communication with the at least one pressurizing pump 36.

In a non-limiting exemplary embodiment, an air filter 38 is in communication with the air delivery tubing 31 and further in communication with the at least one pressurized tank 36 disposed upstream of the halo-shaped body 30.

In a non-limiting exemplary embodiment, the air filter 38 includes a HEPA air filter or equivalent.

In a non-limiting exemplary embodiment, the at least one pressurized tank 32 includes a reflective interior surface 72. The laminar flow purified air system 70 further includes at least one germicidal UVC light 33 positioned within the at least one pressurized tank 32 and located adjacent to the reflective interior surface 72.

In a non-limiting exemplary embodiment, a power source 67 is in communication with the at least one pressurizing air pump 36 and the at least one pressure valve switch 37.

In a non-limiting exemplary embodiment, with reference to FIG. 18, a stacked configuration of system 70 is disclosed, without a need for a backpack. The collar 101 at the bottom may be a hollow circular tube with air inlets for receiving air return (to create a vacuum) and exhalations directed back into the head worn pump (first air displacement source 85) through an inline air filter 38 and return tubing 89. The pump 85 may be a continuous high volume electric air pump. The headwear 65 illustrates a brim having an inner wall and an outer wall forming a hollow passageway therebetween and being filled with air from the pump 85. The brim then is the halo 30.

As perhaps best shown in FIG. 20, in a non-limiting exemplary embodiment, system 70 further includes a first air displacement source 85 (e.g., air pump, fan, etc.) having a first intake air filter 86 and being in communication with the halo-shaped body 30 for downwardly displacing exhaled air of the user away from the halo-shaped body 30, a collar 101 configured to be positioned about a neck of the user, and a second air displacement source 87 (e.g., air pump, fan, etc.) having a second intake air filter 88 and being spaced downstream from the first air displacement source 85 and further being in communication with the collar 101. Such a second air displacement source 87 is configured to receive, cleanse, and guide the exhaled air in communication with the collar 101. A return tubing 89 is attached to the collar 101 and configured to direct the cleansed, exhaled air back into the halo-shaped body 30.

In a non-limiting exemplary embodiment, referring to FIGS. 9-17, the halo-shaped body 30 has a substantially continuous and uninterrupted top surface 90. Advantageously, the air inlet 40 is a single orifice beginning at the substantially continuous and uninterrupted top surface 90 and terminating within the pressure chamber 39 prior to reaching the laminar air outlet 99. The halo-shaped body 30 includes a first ring 30*a*, a second ring 30*b*, a third ring 30*c*, and a fourth ring 30*d*. The second ring 30*b* is positioned between the first ring 30*a* and the third ring 30*c*. The third ring 30*c* is further positioned between the first ring 30*a* and a fourth ring 30*d*. The third ring 30*c* includes an outer circumferential face which faces the inner circumferential face of the second ring 30*b*. The first ring 30*a* includes a hypotenuse side 30*e* that extends from a bottom surface of the second ring 30*b* to the second flat anterior surface of the fourth ring 30*d*.

In a non-limiting exemplary embodiment, each of the pressure chamber 39 and the laminar air outlet 99 is continuous about an entire circumferential length of the halo-shaped body 30. Advantageously, the laminar air outlet 99 is concentrically juxtaposed about the pressure chamber 39.

In a non-limiting exemplary embodiment, the laminar air outlet 99 is ring-shaped and configured to discharge the laminar air 71 outwardly and away from the halo-shaped body 30.

In a non-limiting exemplary embodiment, an entrance velocity of air ingressing the air inlet 40 is greater than an exit velocity of the laminar air 71 egressing the ring-shaped laminar air outlet 99.

In a non-limiting exemplary embodiment, the ring-shaped laminar air outlet 99 is uninterrupted and configured to continuously travel around the entire circumferential length of the halo-shaped body 30.

In a non-limiting exemplary embodiment, a plurality of auxiliary apertures 34 juxtaposed along an inner wall of the halo-shaped body 30 and penetrated through to the pressure chamber 39. Advantageously, the auxiliary apertures 34 (vents) are configured to improve positive pressure air flow via the pressure chamber 39.

In a non-limiting exemplary embodiment, the halo-shaped body 30 has an inner diameter 96 and an outer diameter 97 each continuously extended along the entire circumferential length of the halo-shaped body 30 and configured such that the laminar air 71, egressing the ring-shaped laminar air outlet 99, is continuously and evenly dispersed away from the bottom surface of the halo-shaped body 30.

In a non-limiting exemplary embodiment, the laminar air 71 travels along a curvilinear and U-shaped travel path from the pressurized chamber 39 and out from the laminar air outlet 99.

With reference to FIGS. 1 and 18, the air pump (first air displacement source 85), with power source 67, pushes air into pressurized tank 32 incorporating the UVC light 33, as these are together incorporated as part of a head worn apparatus, where the pressurized tank 32 is then directly connected to the halo 30 air inlet. The wearer's exhaled air, along with additional ambient air, is then collected by the hollow vacuum collar 101 and recirculated back through the replaceable air filter 38 in an inline housing to be filtered and drawn in via a return tube 89 connected to the air pump 85 air inlet. A pressure switch 37 may be used to control the air pump 85 speed to maintain sufficient pressure in the pressurized tank 32 and prevent over pressurization.

With reference to FIG. 20, a first fan (first air displacement source 85) is employed with a replaceable air filter 86 above the face to direct clean air across the face of the user while a second fan (second air displacement source 87) and air filter 88 below the user's face evacuate the air, collect, and filter the exhalations from the user. Such an embodiment does not employ a halo 30.

With reference to FIG. 22, contaminated air traveling through tubing 89 is disinfected via UV light(s) 33. This alleviates the need of sterilization in the pressure tank 72. One or more UV light(s) 33 may be employed. Such UV light(s) 33 may be retrofitted and positioned adjacent to the tubing 89 or within the tubing 89. The tubing 89 is preferably coiled to maximize the travel distance through which the contaminated air travels, as well as to maximize the surface area exposed to the UV light(s) 33.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72 (b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, invent 40ive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A laminar flow purified air system comprising:

a halo-shaped body configured to provide a laminar air flow barrier between a user and an ambient environment surrounding the user, said halo-shaped body having an air inlet and a laminar air outlet and a pressure chamber in fluid communication with both said air inlet and said laminar air outlet;

wherein said air inlet and said pressure chamber are configured to force laminar air out from said laminar air outlet and thereby create said laminar air flow barrier;

wherein said halo-shaped body is ring-shaped and configured to be supported at a head of the user;

wherein said halo-shaped body includes a first ring having a first flat anterior face and a first vertical interior wall directly integral therewith, said first vertical interior wall having a ring shape and being disposed orthogonal to said first flat anterior face and further being extended posterior of said first flat anterior face, a second ring having a flat outer circumferential face and being directly engaged with said first ring, said second ring including an inner circumferential face;

a third ring; and a fourth ring having a second flat anterior face directly engaged with said third ring and being spaced posterior of said first ring and said second ring;

wherein said second ring is positioned between said first ring and said third ring, said third ring further being positioned between said first ring and a fourth ring, said third ring including an outer circumferential face which faces said inner circumferential face of said second ring;

wherein said pressure chamber is disposed between said first ring and said fourth ring;

wherein said air inlet is formed on said first flat anterior face; and wherein an air delivery tubing extends from the air inlet to connect the halo-shaped body to a pressurized tank and a first air displacement source.

2. The laminar flow purified air system of claim 1, wherein said air delivery tubing is configured to transfer air from said at least one pressurized tank to said pressure chamber.

3. The laminar flow purified air system of claim 2, further comprising:

at least one pressurizing pump in communication with said at least one pressurized tank and said air delivery tubing; and at least one pressure valve switch in communication with said at least one pressurizing pump.

4. The laminar flow purified air system of claim 3, further comprising:

an air filter in communication with said air delivery tubing and located within said at least one pressurized tank disposed upstream of said halo-shaped body.

5. The laminar flow purified air system of claim 4, wherein said air filter comprises: a high efficiency particulate air (HEPA) filter.

6. The laminar flow purified air system of claim 5, wherein said at least one pressurized tank includes a reflective interior surface, said laminar flow purified air system further comprising: at least one germicidal ultraviolet-C light positioned within said at least one pressurized tank and adjacent to said reflective interior surface.

7. The laminar flow purified air system of claim 6, further comprising:

a power source in communication with said at least one pressurizing air pump and said at least one pressure valve switch.

8. The laminar flow purified air system of claim 1, further comprising:

said first air displacement source having a first intake air filter and being in communication with said halo-shaped body for downwardly displacing exhaled air of the user away from said halo-shaped body;

a collar configured to be positioned about a neck of the user;

a second air displacement source having a second intake air filter and being spaced downstream from said first air displacement source and further being in communication with said collar, said second air displacement source being configured to receive, cleanse, and guide the exhaled air into said collar; and a return tubing attached to said collar and configured to direct the cleansed exhaled air back into said halo-shaped body.

9. The laminar flow purified air system of claim 1, wherein said halo-shaped body has a substantially continuous and uninterrupted top surface, said air inlet being an orifice beginning at said substantially continuous and uninterrupted top surface and terminating within said pressure chamber prior to reaching said laminar air outlet.

10. The laminar flow purified air system of claim 9, wherein each of said pressure chamber and said laminar air outlet is continuous about an entire circumferential length of said halo-shaped body, wherein said laminar air outlet is concentrically juxtaposed about said pressure chamber.

11. The laminar flow purified air system of claim 10, wherein said laminar air outlet is ring-shaped and configured to discharge the laminar air outwardly and away from said halo-shaped body.

12. The laminar flow purified air system of claim 11, wherein said first diameter and said second diameter are configured such that an entrance velocity of air ingressing said air inlet is greater than an exit velocity of the laminar air egressing said ring-shaped laminar air outlet.

13. The laminar flow purified air system of claim 12, wherein said ring-shaped laminar air outlet is uninterrupted and configured to continuously extend around the entire circumferential length of said halo-shaped body.

14. The laminar flow purified air system of claim 13, wherein said halo-shaped body has an inner diameter and an outer diameter each continuously extended along the entire circumferential length of said halo-shaped body and each configured such that the laminar air, egressing said ring-shaped laminar air outlet, is continuously and evenly dispersed away from a bottom surface of said halo-shaped body.

15. The laminar flow purified air system of claim 14, wherein the laminar air travels along a curvilinear and U-shaped travel path from said pressurized chamber and out from said laminar air outlet.

16. The laminar flow purified air system of claim 1, further comprising: a plurality of auxiliary apertures juxtaposed along said halo-shaped body and penetrated through to said pressure chamber, said auxiliary apertures being configured to improve positive pressure air flow through said pressure chamber.

17. A laminar flow purified air system comprising:

a portable halo-shaped body configured to be attached to an existing brim of an existing hat and further configured to provide a laminar air flow barrier between a user of the existing hat and an ambient environment surrounding the user, said halo-shaped body having a single air inlet and a laminar air outlet and a pressure chamber in fluid communication with both said single air inlet and said laminar air outlet;

wherein said single air inlet and said pressure chamber are configured to force laminar air out from said laminar air outlet and thereby create said laminar air flow barrier;

wherein said halo-shaped body is ring-shaped and configured to be supported near a head of the user;

wherein said halo-shaped body includes a first ring having a triangular cross-sectional shape, the first ring including a first flat anterior face and a first vertical interior wall directly integral therewith, said first vertical interior wall having a ring shape and being disposed orthogonal to said first flat anterior face and further being extended posterior of said first flat anterior face, a second ring having a flat outer circumferential face and being directly engaged with said first ring, a third ring; and a fourth ring having a second flat anterior face directly engaged with said third ring and being spaced posterior of said first ring and said second ring;

wherein said second ring being positioned between said first ring and said third ring, said third ring further being positioned between said first ring and a fourth ring, and where said first ring comprises a hypotenuse side that extends from a bottom surface of said second ring to said second flat anterior surface of said fourth ring;

wherein said pressure chamber is disposed between said first ring and said fourth ring;

wherein said single air inlet is formed on said first flat anterior face; and wherein an air delivery tubing extends from the single air inlet to connect the halo-shaped body to a pressurized tank and a first air displacement source.

* * * * *